United States Patent [19]

Disney

[11] 4,322,066

[45] Mar. 30, 1982

[54] SAW FENCE

[76] Inventor: Fredrick G. Disney, 4201 Rowan Dr., Forth Worth, Tex. 76116

[21] Appl. No.: 111,353

[22] Filed: Jan. 11, 1980

[51] Int. Cl.[3] ........................................ B23Q 3/00

[52] U.S. Cl. ........................................ 269/304

[58] Field of Search ............ 269/73, 25, 228, 303-307, 269/315-320, 285; 83/467 R, 467 A, 468, 438, 522; 308/3 R, 3 A; 144/253 R

[56] References Cited

U.S. PATENT DOCUMENTS

| | | | |
|---|---|---|---|
| 296,191 | 4/1884 | Lawlor . | |
| 345,071 | 7/1886 | Palm . | |
| 372,809 | 11/1887 | Lang . | |
| 410,119 | 8/1889 | Schwab . | |
| 1,081,764 | 12/1913 | Meyers . | |
| 1,195,249 | 12/1916 | Matthews . | |
| 1,566,225 | 12/1925 | Mills . | |
| 1,938,548 | 12/1933 | Tautz . | |
| 1,942,873 | 1/1934 | Narrow . | |
| 1,944,524 | 1/1934 | Parrish . | |
| 2,265,335 | 12/1941 | Aumann . | |
| 2,350,034 | 5/1944 | Herrington | 269/228 |
| 2,381,564 | 8/1945 | Taylor | 269/303 |
| 2,485,274 | 10/1949 | Garrett . | |
| 2,492,686 | 12/1949 | Cummins . | |
| 2,518,728 | 8/1950 | Snow . | |
| 2,630,845 | 3/1953 | Eschenburg . | |
| 2,675,033 | 4/1954 | Hess . | |
| 2,696,854 | 12/1954 | Woodruff . | |
| 2,747,625 | 5/1956 | Small . | |
| 2,779,360 | 1/1957 | Snow . | |
| 2,890,729 | 6/1959 | Horn . | |
| 3,113,807 | 12/1963 | Polidor | 308/3 A |
| 3,391,717 | 7/1968 | Melin . | |
| 3,718,061 | 2/1973 | Wilkin . | |
| 4,018,118 | 4/1977 | Goff . | |
| 4,076,227 | 2/1978 | Rameson | 269/25 |
| 4,206,910 | 6/1980 | Biesemeyer | 269/303 |

*Primary Examiner*—Robert C. Watson

*Attorney, Agent, or Firm*—Richards, Harris & Medlock

[57] ABSTRACT

A workpiece length measuring device for use in positioning a workpiece relative to a cutting tool (22) includes a guide rail (36) positioned transversely from the cutting tool (22). A fence assembly (20) is movable on the guide rail (36) and includes a pair of upstanding parallel guide plates (60, 62), these plates being longer in length than in height. A guide plate connector (64) is attached between the guide plates (60, 62) to maintain the plates in a parallel relation forming a channel therebetween to receive the guide rail (36) therein. The distance from the guide plate connector (64) to the ends of the guide plates (60, 62) remote from the guide plate connector is less than the height of the guide rail (36). A positioner angle (180) is mounted to and extends transversely from one of the guide plates (62) for positioning one end of a workpiece to be cut by the cutting tool (22). A clamp structure (130) is mounted relative to the guide plates (60, 62) and selectively engages the guide rail (36) to fix the fence assembly relative to the guide rail.

6 Claims, 8 Drawing Figures

SAW FENCE

TECHNICAL FIELD

The present invention relates to a workpiece length measuring device for use in positioning a workpiece relative to a cutting tool. More particularly, the present device provides an adjustable fence for positioning a workpiece relative to a saw to facilitate cutting the workpiece to a desired length.

BACKGROUND ART

Power tools such as radial arm and table saws are used extensively in the construction industry. In the use of such tools, there is often the need to accurately position the end of a piece of material, such as lumber and the like, relative to the blade of the saw so that a cut can be made to size the material to the desired length. In the past, numerous fences and other gauging devices have been used to so position the end of materials relative to the cutting blade of the tool. Such devices range from the most basic fence including the permanent attachment of a block a specified distance from the blade of the cutting tool against which the end of the material to be cut is butted prior to cutting, to more sophisticated adjustable fences such as those shown in U.S. Pat. Nos. 2,485,274 to R. G. Garrett; 2,492,686 to W. H. Cummins; 2,747,625 to S. N. Small; 2,779,366 to E. A. Snow; 2,890,729 to J. M. Horn; and 3,391,717 to D. G. Melin.

Although these patents disclose a range of adjustable saw fences, each of these devices represents an overly complex unit which is difficult and expensive to produce and in many cases difficult to use. For example, U.S. Pat. Nos. 2,890,729 and 2,485,274 do not provide unlimited positioning of the workpiece to be cut, but rather provide incremental adjustments only. The apparatus disclosed in U.S. Pat. Nos. 3,391,717 and 2,747,625 disclose units having a movable fence attached to the measuring tape such that the tape expands or retracts as the fence is moved. Further, although these devices provide a rail on which the fence slides, the construction of the fence assembly and its attachment to the rail does not provide an optimum operating relationship.

Similarly, U.S. Pat. Nos. 2,779,306 and 2,492,686 provide fences which translate on a fixed rail. However, these units also fail to provide an optimum structure and relationship between the fence assembly and the rails on which they operate.

Therefore, a need exists for an infinitely adjustable cutting tool fence which is both easy to operate and maintain and simple in construction such that the cost and maintenance of the unit are minimized.

DISCLOSURE OF THE INVENTION

The present invention provides an infinitely adjustable fence for use with various types of horizontal cutting apparatus. Although the primary embodiments are directed to the use of the present invention with a radial arm saw, the present structure is adaptable to any apparatus where linear measurement is needed.

In one embodiment of the invention, the fence is used with a radial arm saw having an elongated support table for supporting material to be cut by the saw. A guide rail having an upstanding leg thereon is positioned relative to the work table and transversely from the saw blade. The fence assembly is movably received on the guide rail and includes a pair of upstanding parallel guide plates connected by a guide plate connector attached to the guide plates to maintain the plates in a spaced, parallel relation. In one embodiment, the guide plates are longer in length than in height and a channel is formed between the confronting surfaces of the guide plates and the guide plate connector. The distance from the guide plate connector to the ends of the guide plates remote from the guide plate connector is less than the height of the guide rail. In this way, the guide plate connector of the fence assembly rides on the rail.

A positioning fence is mounted to and extends transversely from one of the guide plates and serves as a surface for abutment by the end of the workpiece opposite the end to be cut. A clamp structure is mounted for movement with the guide plate and may be selectively operated to engage the guide rail to clamp the guide rail between the clamp structure and one of the guide plates, thereby fixing the fence assembly relative to the guide rail.

In accordance with another embodiment of the invention, bearing structure is mounted in the guide plate connector and extends therefrom for engagement with the guide rail. This structure facilitates movement of the fence assembly on the guide rail.

In accordance with still another embodiment of the invention, the bearing structure includes a pair of spaced ball bearings mounted in respective apertures through the connector plate. The apertures are sized to permit the projection of a portion of the ball bearings to be exposed for engagement with the guide rail. A retainer plate is mounted over the opening of the aperture opposite the guide rail to entrap the ball bearings within the guide plate connector. The retainer plate acts to maintain at least a portion of the ball bearings exposed beyond the surface of the guide plate connector confronting the guide rail to ensure contact of the ball bearings with the guide rail.

In accordance with still another embodiment of the invention, the fence assembly includes a bearing structure mounted in the guide plate from which the positioning fence extends. This bearing structure engages the side of the guide rail to facilitate movement of the fence assembly relative to the guide rail. In one embodiment of the invention, this bearing structure is identical to that bearing structure described above with respect to the ball bearings mounted in the guide plate connector.

The present invention also includes a support channel receiving a measuring tape therein. The support channel is supported in a substantially parallel position relative to the upstanding leg of the guide rail. A position indicator is mounted to the fence assembly and is used in conjunction with the measuring tape to indicate the distance from the cutting tool to the abutment face of the fence angle. A protector for the position indicator is mounted to the fence assembly adjacent the position indicator and includes an upstanding leg mounted adjacent the position indicator to prevent damage to the indicator.

In accordance with one embodiment of the invention, the clamp structure includes a pneumatic cylinder and piston combination mounted to the side of one of the guide plates opposite the other guide plate. An aperture is formed in the guide plate adjacent the pneumatic cylinder and receives the piston therethrough.

Controls are provided for selectively extending and retracting the piston such that the piston engages the guide rail to clamp the guide rail between the piston and the guide plate on the opposite side of the guide rail from the pneumatic cylinder as desired.

In another embodiment of the invention, the clamp structure includes a pantograph linkage having one leg connected to the guide plates. A second leg of the linkage has an extension therefrom with an adjustable plunger mounted thereto. A third leg of the pantograph linkage, opposite the second leg, includes a handle attached thereto whereby the plunger may be moved into and out of engagement with the guide rail by movement of the handle to clamp the guide rail between the plunger and one of the guide plates.

BRIEF DESCRIPTION OF THE DRAWINGS

For a more complete understanding of the present invention, and for further details and advantages thereof, reference is now made to the following description taken in conjunction with the accompanying drawings, in which.

DESCRIPTION OF THE PREFERRED EMBODIMENT

Figure 1:
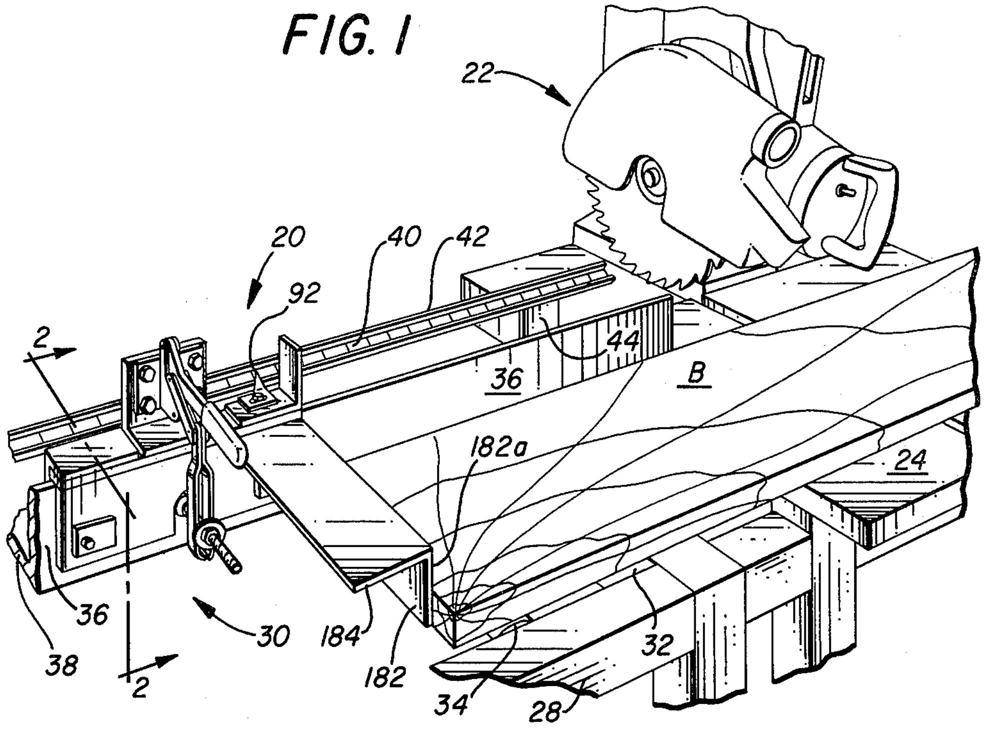
FIG. 1 illustrates a perspective view of the saw fence of the present invention as mounted for use with a radial arm saw.

FIG. 1 illustrates a perspective view of the fence assembly 20 according to the present invention mounted for use with a radial arm saw 22. Saw 22 is suspended from a saw table 24 and has a material support 26 extending laterally from saw 22. Material support 26 includes a channel 28 and an angle 30 extending from table 24 and interconnected by a plurality of angles 32. The table also may incorporate rollers 34 to facilitate the movement of material, such as board B which is moved thereon relative to saw 22. Angle 30 includes an upstanding leg or guide rail 36 and a substantially horizontal leg 38.

A measuring tape 40 is mounted within a channel 42 which is in turn supported substantially parallel to angle 30 by support angles 44. In the illustration of FIG. 1 saw 22 is oriented to make a straight end cut of board B, that is, the blade is oriented at right angles to material aligned along guide rail 36 of angle 30. However, it will be understood that the present invention may also be used with the saw adjusted at an angle to the make mitered cuts.

Figure 3:
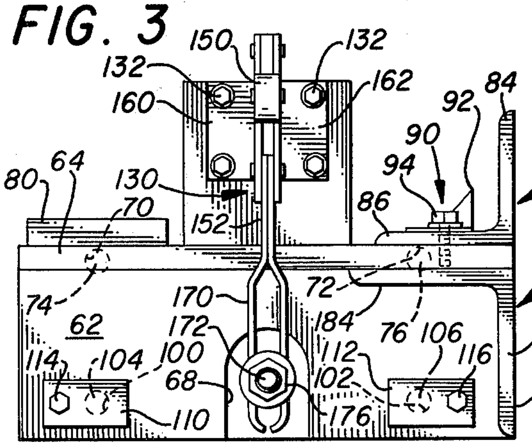
FIG. 3 illustrates a side view of the fence assembly of the present invention.

Fence assembly 20, and its relationship to angle 30 and measuring tape and channel 40 and 42, respectively, are best described by references to FIGS. 2–5 in conjunction with FIG. 1. Referring then to FIGS. 1–5, fence assembly 20 includes upstanding guide plates 60 and 62 joined in a parallel relation by a guide plate connector 64. Guide plates 60 and 62 may be attached to guide plate connector 64 by welding or other suitable means. A channel 66 is formed within the inwardly facing surfaces of guide plates 60 and 62 and guide plate connector 64. As is best seen in FIG. 3, guide plates 60 and 62 are substantially the same dimension and are longer in length than in height. Further, guide plate 62 has a cutout 68 formed therein.

Figure 2:
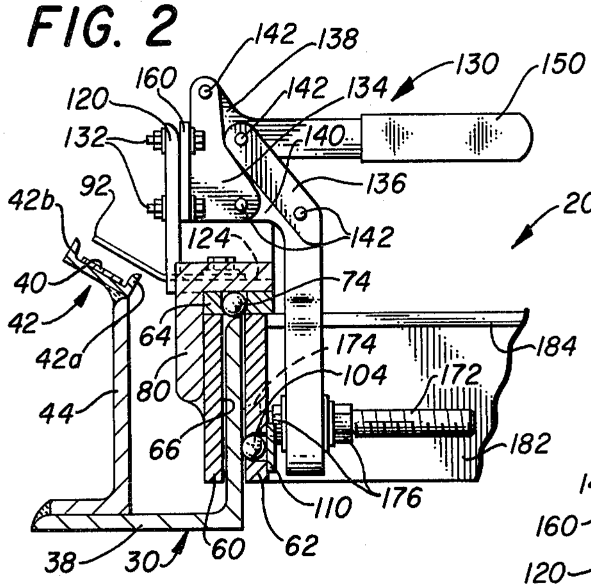
FIG. 2 illustrates a section view taken along line 2—2 of FIG. 1.
Figure 6:
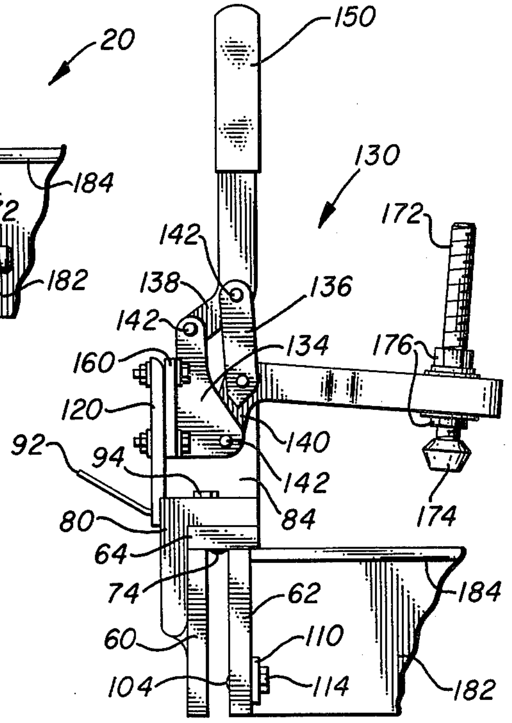
FIG. 6 illustrates the clamp assembly of the present invention in the released position.
Figure 5:
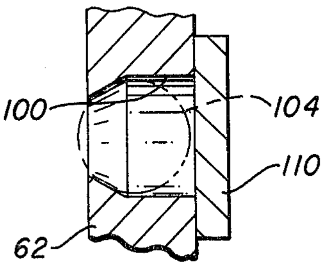
FIG. 5 illustrates an exploded view of the bearing assembly used in the present invention.

As is shown in FIGS. 2 and 3, and in greater detail in FIG. 5, a pair of spaced apertures 70 and 72 are formed within guide plate connector 64. These apertures are formed from the exterior face of guide plate connector 64 such that the opening on the exterior face is slightly larger than the diameter of ball bearings 74 and 76 received within apertures 70 and 72. The apertures on the inwardly facing surface of guide plate connector 64 are slightly smaller in diameter than the diameter of ball bearings 74 and 76 such that the bearings may be slightly exposed through apertures 70 and 72 into channel 66. A stiffener angle 80 is attached to guide plate connector 64 entrapping ball bearing 74 within aperture 70. The size of ball bearing 74 is dimensioned so that its entrapment within aperture 70 assures the slight projection of ball bearing 74 into channel 66.

Figure 4:
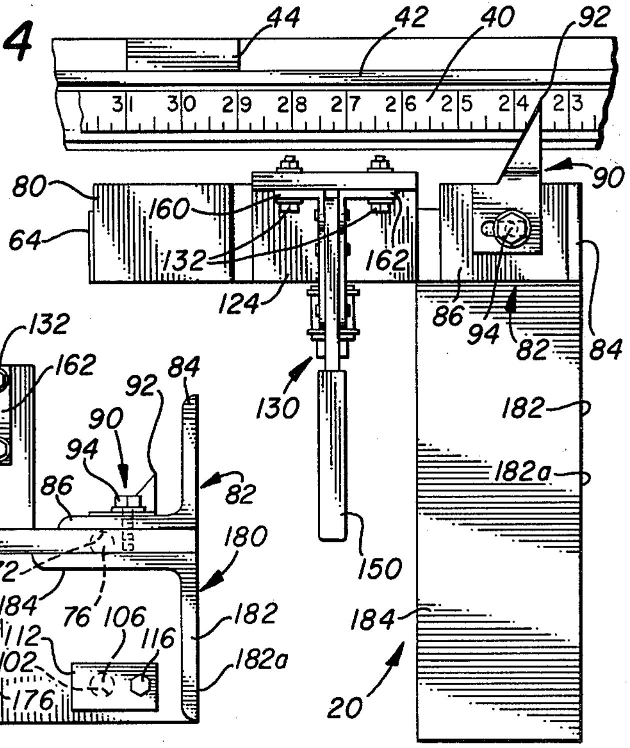
FIG. 4 illustrates a top view of the fence assembly of the present invention.

Referring now specifically to FIG. 3, a positioner angle 82 is similarly mounted to guide plate connector 64 to entrap ball bearing 76 within aperture 72. Entrapment of ball bearing 76 assures the slight exposure of the ball bearing into channel 66 for the purpose to be described in more detail hereinafter. Positioner angle 82 includes an upstanding leg 84 and a base leg 86. Base leg 86 is attached to guide plate connector 64 overlying aperture 72 and entrapping ball bearing 76 within aperture 72. As is also shown in FIGS. 3 and 4, a position indicator 90 having a pointer 92 formed thereon is attached to positioner angle 82 and guide plate connector 64 by an appropriate bolt 94.

Referring to FIGS. 2 and 3, apertures 100 and 102 are formed in guide plate 62. Ball bearings 104 and 106 are received in apertures 100 and 102, respectively. Apertures 100 and 102 are formed from the outer facing surface of guide plate 62 and the diameter at the outer facing surface is slightly larger than the diameter of ball bearings 104 and 106. Apertures 100 and 102 have a smaller diameter at the inwardly facing surface of guide plate 62 such that the aperture at this surface is smaller than the diameter of ball bearings 104 and 106. This permits the slight exposure of ball bearings 104 and 106 out of apertures 100 and 102 into channel 66. As is best shown in FIGS. 2 and 3, retaining plates 110 and 112 are mounted to guide plate 62 by appropriate bolts 114 and 116, respectively, to overlay apertures 100 and 102. Plates 110 and 112 entrap ball bearings 104 and 106, respectively, in apertures 100 and 102. Ball bearings 104 and 106 are sufficiently sized in relation to the thickness of guide plate 62 such that plates 110 and 112 force a slight exposure of the ball bearings into channel 66.

Referring still to FIGS. 2 and 3, a clamp mount angle 120, including an upstanding leg 122 and a base leg 124, is mounted to guide plate connector 64 by appropriate means such as welding or the like. A manual clamp assembly 130 is attached to upstanding leg 122 by four bolts 132. Manual clamp 130 includes a pantograph linkage having a mount leg 134 and an opposite leg 136 joined by upper leg 138 and lower leg 140 at pins 142. A handle 150 is an extension of upper leg 138 and a stop leg 152 is an extension of lower leg 140. Mount leg 134 is formed with a pair of mount flanges 160 and 162 having apertures therein for receiving bolts 132 therethrough for attachment of clamp 130 to upstanding leg 122 of angle 120.

As can be seen in FIGS. 2 and 3, stop leg 152 has a bifurcated end portion 170 and receives a stop bolt 172 therethrough. Stop bolt 172 has a rubber bushing 174 mounted on one end thereof with the other ends being threaded to receive adjustment nuts 176 thereon. As can be seen in FIG. 2, by adjusting nuts 176, stop bolt 172 may be advanced or withdrawn relative to stop leg 152. This enables the operator to adjust the clamping pressure exerted by clamp 130 on guide rail 36.

A positioner angle 180, including a vertical leg 182 and a base leg 184, is mounted to a guide plate 62 and extends laterally therefrom. Positioner angle 180 provides a large abutment surface area along the outwardly extending face of vertical leg 182 for abutment thereagainst of material to be cut. This enables an operator to position several pieces of material to be cut at one time against positioner angle 180 so that the pieces may be cut simultaneously in one operation.

As can be seen in FIG. 2, guide rail 36 is received within channel 66 and engages ball bearings 74 and 76 within guide plate connector 64. Further, because of the weight distribution of the fence assembly, bearings 104 and 106 also are in engagement with guide rail 36. Although the primary embodiment illustrated in the drawings shows the use of ball bearings 74 and 76 in guide plate connector 64 and ball bearings 104 and 106 in guide plate 62, the present invention also encompasses the use of the fence assembly according to the drawings without these bearings. In this event, guide rail 36 engages guide plate connector 64 at its upper edge and guide plate 62 along the side thereof. While the present figures illustrate the use of ball bearings, it will be understood that roller and pin bearings may be used in the place of the ball bearings illustrated with the roller bearings exposed within channel 66 for engagement with guide rail 36 as described with respect to ball bearings 74 and 76 and ball bearings 104 and 106.

As can be seen in FIG. 2, guide plates 60 and 62 are slightly shorter in height than guide rail 36. Thus, guide plate connector 64, or bearings mounted therein, engage the top of guide rail 36 without the engagement of the lower edges of guide plates 60 and 62 with the horizontal leg 38 of angle 30.

As is best shown in FIGS. 2 and 4, measuring tape 40 is mounted within tape channel 42. A channel support angle 44 is attached to base leg 38 of angle 30 and is supported therefrom. As can be seen in FIG. 2, channel 42 provides substantial protection to tape 40 through upstanding legs **42*a* and 42*b*. The angle at which tape channel 42 and therefore measuring tape 40 is positioned provides for quick and easy visual inspection of the measuring tape with position indicator 90**.

FIG. 5 illustrates clamp assembly 130 in the raised position. Merely by raising handle 150, the pantograph linkage is translated to withdraw stop bolt 172 out of channel 66 and away from guide rail 36.

With the clamp in the raised position and with the fence assembly 20 positioned on guide rail 36 with guide plates 60 and 62 straddling the guide rail and the guide rail engaging ball bearings mounted in guide plate connector 64 and guide plate 62, fence assembly 20 may be moved as desired along guide rail 36 and laterally to and from saw 22 by merely sliding the assembly. No cranks or gears are required to translate the fence assembly along the guide rail, thereby simplifying the overall operation of the fence assembly. Movement of the fence assembly may be made in any increment and positioned at an infinite number of selected locations. The measuring tape 40 is positioned relative to the position indicator pointer 92 such that the pointer indicates on the measuring tape the exact distance from the outwardly facing abutment surface **182*a* of vertical leg 182 to the blade of saw 22. More exactly, the dimension measured is the dimension a workpiece will have after cut by saw 22 with one end positioned in abutment against positioner angle 180. Measuring tape 40 reads from right to left to provide the appropriate dimension from the fence angle to the saw blade. The fence of the present invention may also operate to the right of the saw. In this case, tape 40** will naturally read from left to right to provide a reading of the distance from the saw to the fence abutment face.

With the fence assembly in the desired position, clamp 130 is engaged by depressing handle 150, thereby advancing stop bolt 172 and rubber bushing 174 attached thereto against guide rail 36. In this way, guide rail 36 is clamped between stop bolt 172 and guide plate 60 to fix fence assembly 20 relative to guide rail 36. Thus, repeated adjustments may be made at will by simply engaging and disengaging clamp assembly 130 and sliding fence assembly 20 relative to guide rail 36.

As can also be appreciated, this movement of the fence assembly relative to guide rail 36 is greatly facilitated by the arrangement and design of guide plates 60 and 62 and guide plate connector 64. In the embodiment illustrated, with ball bearings 74 and 76 and ball bearings 104 and 106 mounted in guide plate connector 64 and guide plate 62, the overturning moment of the fence assembly caused by the weight of the clamp assembly 130 and positioner angle 182 is reacted at ball bearings 104 and 106. These bearings are positioned sufficiently below the counteracting point at the upper edge of guide rail 36 so as to sufficiently reduce these reaction forces. This results in an ease of movement of the fence assembly relative to the guide rail 36. The movement of the fence assembly is also facilitated because of this arrangement of components when ball bearings described above are not employed in the fence assembly.

Further, the position indicator 90 is provided with significant protection from damage and misalignment by upstanding leg 84 of position indicator angle 82 mounted immediately adjacent thereto. In this way, adjustment of the position indicator to provide an accurate reading of the dimension from the fence assembly to the saw blade is protected by preventing engagement and misalignment of the position indicator by use of the apparatus.

Therefore, the present arrangement provides a fence assembly which is simplified in construction and therefore capable of being produced at a lower cost than fence assemblies heretofore invented. Further, the fence assembly according to the present invention is substantially simpler in use and more accurate in operation than the devices heretofore used. The unit is adaptable to a wide range of tables or stands used with cutting material and provides for an infinite positioning of the fence assembly relative to the cutting tool. The bearing assemblies provide easy movement of the fence along the guide rail, making the use of the fence faster and more convenient than prior art units. Further, the unit is easily disassembled for repair or replacement of parts.

Figure 7:
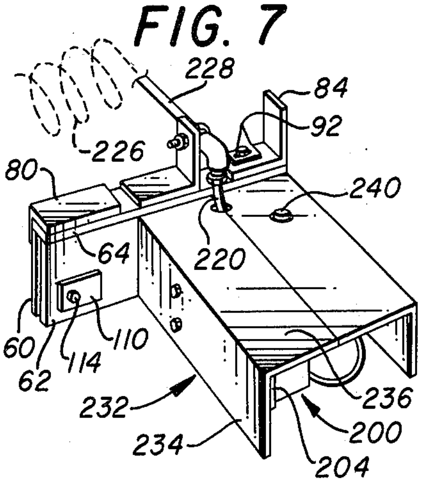
FIG. 7 illustrates a perspective view from above of an alternative embodiment of the present invention having a pneumatic controlled clamp assembly.
Figure 8:
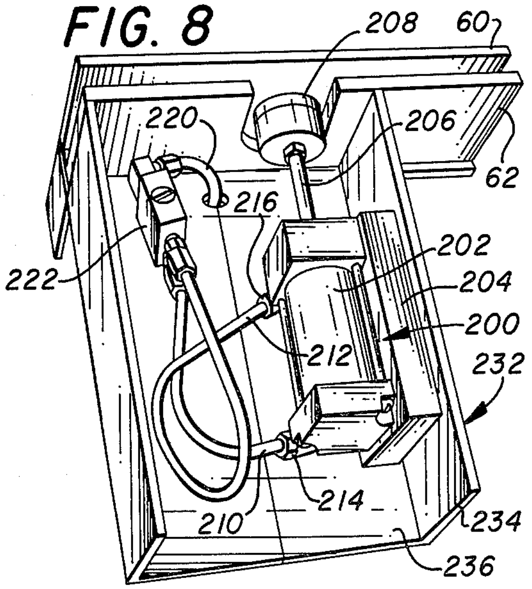
FIG. 8 illustrates a perspective view from below of the alternative embodiment shown in FIG. 7.

Referring to FIGS. 7 and 8, an alternative clamp assembly for use with the fence assembly of the present invention is illustrated. In this embodiment, clamp assembly 130 illustrated in FIGS. 1–6 is replaced by a clamp assembly 200. Clamp assembly 200 includes a pneumatic controlled cylinder 202 mounted on a base 204. A plunger shaft 206 extends from cylinder 202 and has a resilient stop head 208 attached to the end opposite cylinder 202. Air lines 210 and 212 communicate to cylinder 202 through appropriate fittings 214 and 216, respectively. An air supply line 220 is coupled to lines 210 and 212 by a valve 222. A flexible supply line hose 226 is connected through an appropriate connector structure 228 to supply line 220. Clamp assembly 200 is mounted to a support angle 232 extending laterally from guide plate 62. Support angle 232 includes an upstanding leg 234 and a horizontal base leg 236 which has an edge in abutment with the edge of base leg 184 of positioner angle 180.

In operation of the clamp assembly illustrated in FIGS. 7 and 8, valve 222 is controlled by switch 240 to direct air through either line 210 or 212. Valve 222 is biased to communicate air under pressure from supply line 220 to line 210 to extend shaft 206 and stop head 208. In this situation, the extension of shaft 206 and stop head 208 results in the clamping of guide rail 36 between stop head 208 and guide plate 60 to fix the fence assembly relative to the guide rail. By engaging button switch 240, air under pressure from supply line 220 is communicated to cylinder 202 through line 212 acting on the opposite side of an internal piston within cylinder 202 to withdraw shaft 206 and stop head 208 from engagement with guide rail 36. In this mode, the fence assembly may be moved as desired relative to guide rail 36 to position the fence therealong.

As can be appreciated by a review of FIGS. 7 and 8, the air cylinder and switch are enclosed within angles 232 and 180 in such a manner as to protect them from damage or abuse from normal operation of the fence assembly.

Although preferred embodiments of the invention have been described in the foregoing detailed description and illustrated in the accompanying drawings, it will be understood that the invention is not limited to the embodiments disclosed but is capable of numerous rearrangements, modifications and substitutions of parts and elements without departing from the spirit of the invention. The present invention is therefore intended to encompass such rearrangements, modifications and substitutions of parts and elements as fall within the scope of the appended claimed.

I claim:

1. An apparatus for positioning a workpiece relative to a tool comprising:
- a guide rail having an upstanding nontubular leg,
- a fence assembly movable on said guide rail and including:
  - first and second upstanding parallel guide plates, said plates being longer in length than in height and said first guide plate having a cutout therethrough in line with at least a portion of said second guide plate,
  - a guide plate connector joining the upper ends of said guide plates to maintain said guide plates in a spaced, parallel relation and forming a channel between the confronting surfaces of said guide plates having a width less than the height of said guide plates, said distance from the guide plate connector to the ends of said guide plates remote from said guide plate connector being less than the height of said guide rails,
  - bearing means mounted in said guide plate connector and extending therefrom for engagement with said guide rail to facilitate movement of said fence assembly on said guide rail,
  - bearing means mounted in said first guide plate, said bearing means for engaging the side of said guide rail to facilitate movement of the fence assembly relative to the guide rail,
  - a positioning fence mounted to and extending transversely from said first guide plates, and
  - clamp means mounted to said fence assembly by attachment to said guide plate connector for movement with said fence assembly and having a linkage including an engaging leg for engagement of said guide rail through the cutout in said first guide plate to clamp said guide rail against said second guide plate.

2. The apparatus according to claim 1 wherein said bearing means includes a pair of spaced ball bearings mounted in an aperture through said guide plate connector, said aperture permitting a portion of the ball bearings to be exposed for engagement with said guide rail, and
- a retainer plate for entrapping each of said ball bearings within said plate connector, said retainer plate acting to maintain at least a portion of said ball bearings exposed beyond the surface of said plate connector confronting said guide rail to ensure contact of said ball bearings with said guide rail.

3. The apparatus according to claim 1 wherein said bearing means includes a pair of spaced ball bearings mounted in an aperture through said guide plate, said aperture permitting a portion of the ball bearings to be exposed for engagement with said guide rail, and
- a retainer plate for entrapping each of said ball bearings within said guide plate, said retainer plate acting to maintain at least a portion of said ball bearings exposed beyond the surface of said guide plate confronting said guide rail to ensure contact of said ball bearings with said guide rail.

4. An apparatus for positioning a workpiece relative to a tool comprising:
- a guide rail having an upstanding leg,
- a fence assembly movable on said guide rail and including:
  - a pair of upstanding parallel guide plates, said plates being longer in length than in height,
  - a guide plate connector attached to the upper ends of said guide plates to maintain said guide plates in a spaced, parallel relation and forming a channel between the confronting surfaces of said guide plates, said distance from the guide plate connector to the ends of said guide plates remote from said guide plate connector being less than the height of said guide rails such that said connector plate of said fence assembly rides on said guide rail when said fence assembly is mounted on said rail,
  - a positioning fence mounted to and extending transversely from one of said guide plates,
  - clamp means mounted for movement with said guide plate for engaging said guide rail to clamp said guide rail against one of said guide plates,
- a support channel receiving a measuring tape therein,
- means for supporting said channel in a position substantially parallel to said upstanding leg,
- a position indicator mounted to said fence assembly for cooperating with said measuring tape to indicate the distance from the tool to the abutment face of said fence angle adjacent the tool, and a position indicator protector including an upstanding leg mounted adjacent to said position indicator to prevent damage to the position indicator.

5. The apparatus according to claim 1 wherein said clamp means includes:

a pantograph linkage having first and second legs interconnected by third and fourth legs, said first leg connected to said guide plates, said third leg opposite said first leg having an extension therefrom and an adjustable plunger mounted thereon, and said fourth leg opposite said third leg including a handle attached thereto whereby said plunger may be translated into and out of engagement against said guide rail by movement of said handle to clamp said guide rail between said plunger and said second guide plate.

6. An apparatus for positioning a workpiece relative to a cutting device having an elongated support table with a cutting tool positioned relative thereto for cutting the workpiece as it is positioned by the apparatus and supported on the table, said apparatus comprising:

a guide rail having an upstanding leg and positioned relative to the work table and transversely from the cutting tool, a fence assembly movable on said guide rail and including:

a pair of upstanding parallel guide plates, said plates being longer in length than in height, a guide plate connector attached to said guide plates to maintain said plates in a spaced, parallel relation to form a channel between the confronting surfaces of said guide plates and said guide plate connector, said distance from the guide plate connector to the ends of said guide plates remote from said guide plate connector being less than the height of said rail such that said guide plate connector rides on said rail, a positioning fence mounted to and extending transversely from one of said guide plates for abutment with one end of said workpiece, clamp means mounted for movement with said guide plate for engaging said guide rail to one of said guide plates thereby fixing said fence assembly relative to said guide rail, a support channel receiving a measuring tape therein, means for supporting said channel in a position substantially parallel to said upstanding leg, a position indicator mounted to said fence assembly for cooperating with said measuring tape to indicate the distance from the tool to the abutment face of said fence angle adjacent the tool, and a position indicator protector including an upstanding leg mounted adjacent to said position indicator to prevent damage to the position indicator.

* * * * *